United States Patent [19]

Sorola

[11] Patent Number: 5,150,539
[45] Date of Patent: Sep. 29, 1992

[54] SWIVEL CONSTRUCTION

[76] Inventor: Bret S. Sorola, 882 N. Salem #3, Essexville, Mich. 48732

[21] Appl. No.: 662,416

[22] Filed: Feb. 28, 1991

[51] Int. Cl.⁵ .............................................. A01K 91/00
[52] U.S. Cl. .................................. 43/43.1; 43/43.12; 403/305; 403/306
[58] Field of Search ............... 43/43.1, 43.12; 59/95; 24/136 R; 403/300, 305, 306

[56] References Cited

U.S. PATENT DOCUMENTS

| | | | |
|---|---|---|---|
| 913,056 | 2/1909 | Rounds | 59/95 |
| 1,766,532 | 6/1930 | Pflueger | 43/43.1 |
| 4,369,551 | 1/1983 | Heredia | 43/43.1 |
| 4,600,331 | 7/1986 | Gray | 59/95 |
| 4,633,609 | 1/1987 | Brown | 43/43.1 |
| 4,669,907 | 6/1987 | Patton | 59/95 |

Primary Examiner—Richard K. Seidel
Assistant Examiner—Chuck Y. Mah
Attorney, Agent, or Firm—Learman & McCulloch

[57] ABSTRACT

A swivel for coupling a fishing line to a lure and having a body from opposite ends of which extend rotatable connectors respectively adapted for removable connection to the line and the lure. The body has a cavity between its ends into which the connectors extend and each connector is supported in a removable journal in latching engagement with the body. Each connector is separably secured to a retainer which restrains axial movement of the connector.

19 Claims, 2 Drawing Sheets

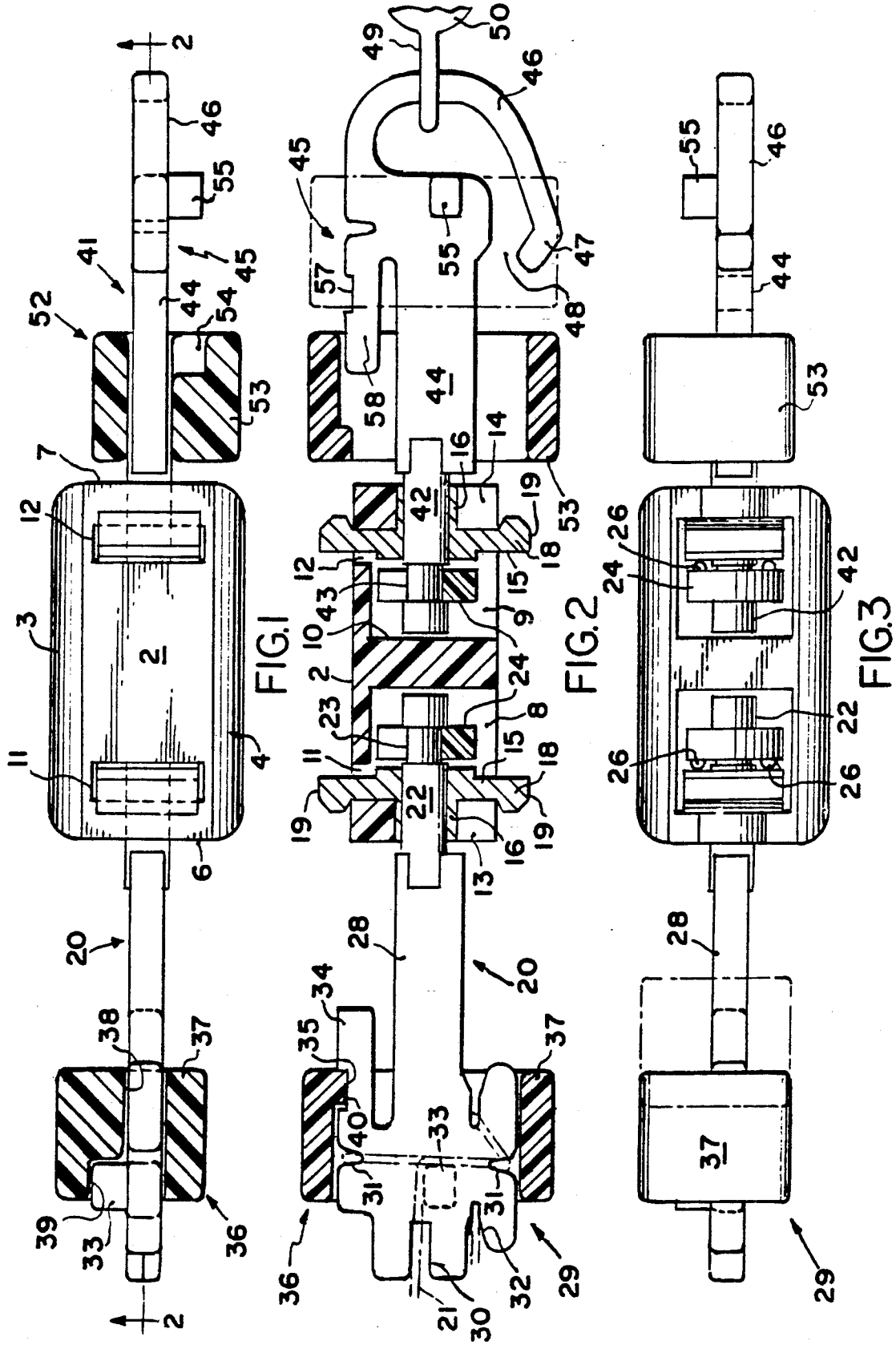

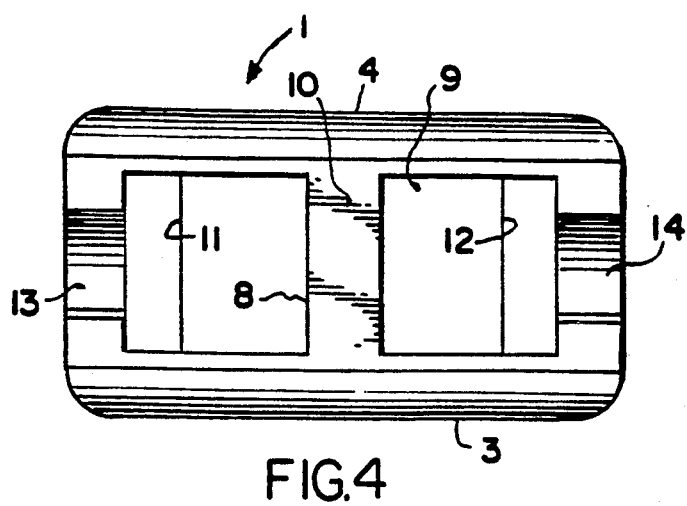
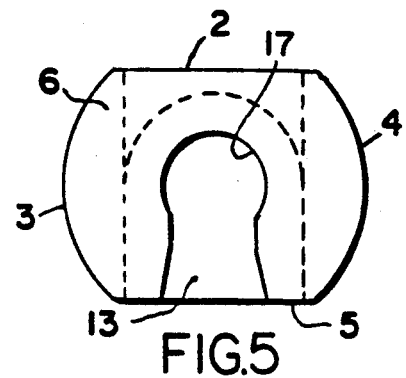
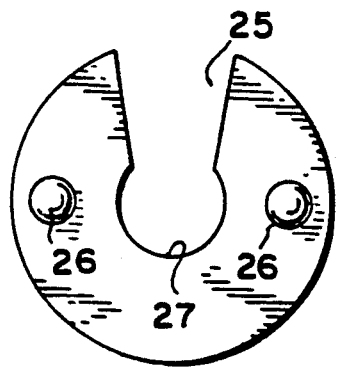
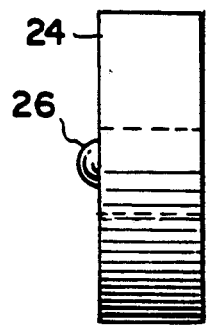
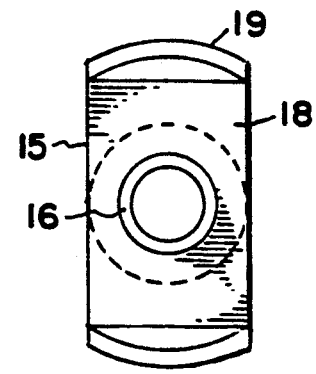
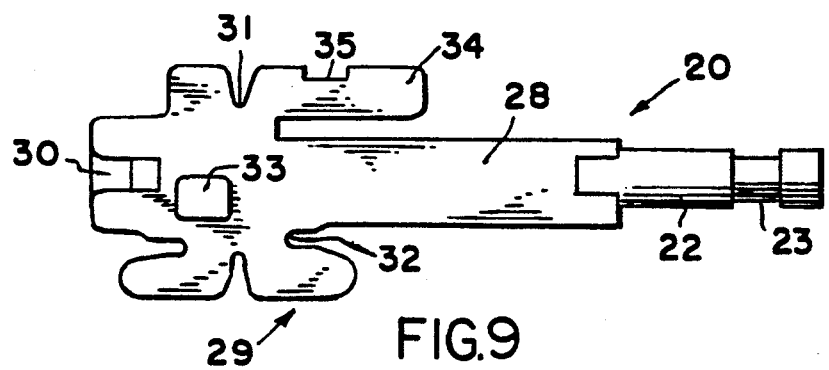
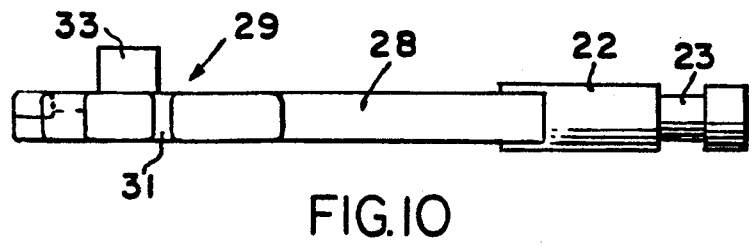

SWIVEL CONSTRUCTION

This invention relates to a swivel construction of the kind adapted to couple a fishing tackle item, such as a lure, to a fishing line and more particularly to a swivel which is virtually invisible to fish and which requires no tools of any kind to assemble and disassemble the swivel or connect and disconnect it to and from a fishing line and lure.

BACKGROUND OF THE INVENTION

The prior art contains many examples of swivels by means of which hooks, lures, minnows, and other forms of bait may be secured to a fishing line in such a manner as to avoid undesirable movement, such as rotation, of the tackle item during its movement through the water being fished. The known swivels conventionally comprise a body composed of two or more relatively rotatable parts having eyes at opposite ends thereof. The parts conventionally are formed of corrosion resistant material, such as brass. The ability of the parts of the body to rotate makes it possible for a lure to be drawn through a body of water without imparting rotation of the lure about the axis of the fishing line. One of the problems associated with known, metallic swivels is that they are visible to fish.

As indicated above, most of the swivels of known construction conventionally have an eye at opposite ends of the swivel body. Some of these eyes are formed by springy components which may or may not permit a line or lure to be attached to the eye without the tying of a knot. In most instances, however, the fishing line or leader is secured to the swivel eye by means of a knot or by a loop which results from the tying of a knot. In other instances a pair of pliers or other tool must be used to condition the swivel for use. The tying of knots and the manipulation of a tool can be quite difficult, particularly in those instances in which the weather is cold or when the eye of the swivel is of small diameter.

Apparatus constructed in accordance with the invention overcomes the disadvantages referred to above of known swivel constructions.

SUMMARY OF THE INVENTION

A swivel constructed according to the invention comprises a body having a pair of axially spaced cavities therein and in each of which is accommodated a connector which extends through the respective end walls of the body. Each connector is rotatable relative to the body and is removably retained in its cavity by a separable retainer.

One of the connectors is adapted for connection to one end of a fishing line, whereas the other of the connectors is adapted for connection to a fishing tackle item, such as a lure.

Neither the fishing line nor the lure need be tied to the connector. Instead, each connector is constructed in such manner as to enable either the fishing line or the lure to be secured by a manually operable clasp. No tool of any kind is required to condition the swivel for operation.

All of the parts of the swivel are formed of a material which is virtually invisible in water.

THE DRAWING

The preferred embodiment of the invention is illustrated in the accompanying drawings wherein:

FIG. 1 is a top plan view, partly in section, of an assembled swivel;

FIG. 2 is a sectional view taken on the line 2—2 of FIG. 1 and partially illustrating a fishing line and a lure;

FIG. 3 is a bottom plan view;

FIG. 4 is a bottom plan view of the body of the swivel;

FIG. 5 is an elevational view of one end of the body;

FIG. 6 is an enlarged elevational view of a retainer;

FIG. 7 if a side elevational view of the retainer;

FIG. 8 is an elevational view of a journal;

FIG. 9 is a plan view of one of the connectors; and

FIG. 10 is a side elevation of the connector.

DETAILED DESCRIPTION

A swivel constructed in accordance with the preferred embodiment of the invention comprises a body 1 having a flat top side or wall 2, curved sides 3 and 4, and a bottom side or wall 5. At opposite ends of the body are end walls 6 and 7, respectively.

The body has a pair of axially spaced cavities 8 and 9 therein, the cavities being spaced by a partition 10. The cavity 8 has an opening 11 which extends through the wall 2 and the cavity 9 has a similar opening 12. The end wall 6 has a keyhole opening 13 therein and the end wall 7 has a similar opening 14.

Removably accommodated in the cavity 8 is a journal 15 having a cylindrical bushing 16 that is snap fitted into the circular part 17 of the slot 13. The journal 15 has a web 18 which terminates at its opposite ends in projections 19, one of which overlies the top wall 2 of the body and the other of which overlies the bottom wall 5 of the body. The projections 19 serve to latch the journal in the cavity 8. An identical journal 15 removably occupies the cavity 9, and corresponding parts are identified by corresponding reference characters.

At one end of the body is a connector 20 that is adapted to be coupled to a fishing line 21. The connector 20 includes a cylindrical spindle 22 which extends through the bushing 16 of the journal 15 into the cavity 8. That part of the spindle 22 which extends into the cavity 8 has a reduced diameter groove 23 therein which accommodates a retainer 24 having a keyhole slot 25 therein. One face of the retainer 24 preferably includes a pair of hemispherical projections or bearings 26 which confront the adjacent side of the journal 15. The slot 25 has a circular portion 27 having a diameter corresponding substantially to that of the groove 23, thereby enabling the retainer 24 to be snap fitted onto the spindle 22 with the grooved portion 23 snugly, but removably, retained in the circular part 27.

The connector 22 has a shank 28 which is flat on both sides and terminates at one end in an enlarged tip or anchor 29 having an axial groove 30 in one face, a pair of lateral grooves 31, and a laterally displaced, axial groove 32 that parallels the groove 30. The anchor also includes an upstanding abutment 33 and a flexible finger 34 having a notch 35 therein between its ends.

Overlying the anchor 29 is a clasp 36 comprising a sleeve 37 having a flat bore 38 in which the anchor 29 slideably is received. The sleeve has a recess 39 in which the projection 33 may be accommodated and the sleeve also has a lip 40 that may be accommodated in the notch 35.

A second connector 41 is provided for removable coupling to the opposite end of the body 1 and comprises a cylindrical spindle 42 which extends through the bushing 16 of the journal 15 that is accommodated in the cavity 9. The spindle 42 has a reduced diameter groove 43 which is accommodated in the circular part 27 of the second retainer 24. Extending from the spindle 42 is a flattened shank 44 that terminates at its free end in a tip or anchor 45 from which extends a flexible finger 46 having a free end 47 normally spaced from the anchor a distance sufficient to provide a passage 48. The finger 46 is adapted to be accommodated in an eye 49 of a fishing tackle item 50 such as a lure.

The finger 46 is adapted to be moved from an open position, as shown in FIG. 2, to a closed position and maintained in such position by a clasp 52 comprising a sleeve 53 which is slideable longitudinally from the position shown in full lines in FIG. 2 to the chain line position. The sleeve thus may cam the free end of the finger 46 to a position in which it closes the passage 48. The sleeve has a notch 54 in which a stop 55 on the tip 41 may be accommodated to limit movement of the clasp in one direction, and the sleeve also has a lip 56 which may be accommodated in a notch 57 formed in a finger 58 to latch the clasp 52 in the position it occupies when it overlies the finger 46.

If the various parts are disassembled from one another, they may be assembled in the following manner: the clasp 36 may be assembled with the connector 20 by sliding the sleeve 37 onto the spindle 22 from the free end of the latter. The clasp 52 may be assembled with the spindle 42 by sliding the sleeve 53 over the free end of the spindle. One journal 15 then may be fitted into the cavity 8 so that the projection 19 at one end passes through the opening 11 and bears against the adjacent, upper side 2 of the body 1. The projection 19 at the opposite end bears against the lower side 5 of the body. The journal 15 thus is snugly secured in the cavity 8. The other journal 15 similarly may be fitted into the cavity 9.

Following fitting of the journals 15 into the respective cavities the spindle 22 may be extended through the end wall 6 and the bushing 16 of the journal 15 so as to occupy the cavity 8. The retainer 24 then may be fitted onto the grooved part 23 of the spindle 22 with the bearings 26 confronting the bushing 15.

The spindle 42 of the tip 45 similarly may be thrust through the bushing 16 of the associated journal 15 for accommodation in the cavity 9. The retainer 24 then may be fitted onto the spindle 42 at the groove 43 with its bearings 26 confronting the bushing. In these positions of the several parts the connectors 20 and 41 are securely, but removably, and rotatably accommodated in the cavities 8 and 9 of the body and project beyond opposite ends of the latter. The bearings 26 on the retainers 24 impose little resistance to rotation of the respective connectors.

To secure the connector 20 to the fishing line 30, the clasp 36 is slid to the chain line position shown in FIG. 3, whereupon one end of the line 21 is laid in the groove 30, turned around the stop 33 and wound several times around the tip in the groove 31. The free end of the line then may be fitted into the groove 32 and wrapped around the tip parallel to the longitudinal axis of the connector. The clasp 36 then may be returned to the position shown in FIG. 2 so as to overlie the wound end of the fishing line and trap the latter in place. The lip 40 of the sleeve 37 removably will be accommodated in the notch 35 so as to maintain the sleeve in place. The finger 34 is sufficiently flexible to enable the lip 40 to be removed from the notch 35 when desired.

To couple the lure 50 to the connector 41, the clasp 52 is moved to the position shown in full lines in FIG. 2, thereby enabling the finger 46 to spring to a position in which the passage 48 is sufficiently open to receive the eye 49. Following accommodation of the eye 49 in the loop formed by the finger 46, the clasp 52 may be slid toward the right, as viewed in FIG. 2, whereupon the free end of the finger 46 will be cammed in a direction to close the passage 48 and locate the finger 46 within the sleeve 53. The movement of the sleeve to the right is limited by the stop 55 and return movement of the sleeve is limited by the accommodation of the lip 56 in the notch 57. However, the finger 58 is of sufficient flexibility as to enable the lip 56 to be withdrawn from the notch 57 when it is desired to return the sleeve 53 to the position shown in full lines in FIG. 2.

The line 30 and the lure 50 may be removed from the respective connectors 20 and 41 by reversing the procedural steps described above and the several parts of the swivel may be disassembled by reversing the assembling steps referred to earlier.

From the foregoing it will be clear that no tools of any kind are required to assemble and disassemble the several components of the swivel construction. Nor is it necessary to utilize any tools to connect the swivel to a fishing line or to a lure or other bait. Further, it is not even necessary to tie any knots to ensure secure retention of the swivel on a fishing line.

None of the parts of the swivel are formed of metal, thereby wholly avoiding the possibility of deterioration due to rust, oxidation, corrosion, and the like. Preferably, the parts are formed of a material, such as polycarbonate, which is virtually invisible in water.

The disclosed embodiment is representative of a presently preferred form of the invention, but is intended to be illustrative rather than definitive thereof. The invention is defined in the claims.

I CLAIM:

1. A swivel construction for attaching a fishing tackle element to a fishing line, said construction comprising a body; a connector having one end thereof rotatably coupled to said body and its opposite end extending beyond one end of said body; anchor means carried by said opposite end of said connector and on which one end of a fishing line may be wound; releasable clasp means carried by said connector for movement into and out of a position in which a fishing line wound on said anchor means is trapped thereon; and coupling means carried by said body at its opposite end for removably coupling a fishing tackle element to said body.

2. The construction according to claim 1 wherein said body has a cavity in which said one end of said connector is accommodated and retainer means reacting between said body and said connector for removably retaining said one end of said connector in said cavity.

3. The construction according to claim 1 wherein said clasp means comprises a sleeve movable longitudinally of said connector into and out of overlying relation with said anchor means.

4. The construction according to claim 1 wherein said coupling means comprises a hook-like finger defining a passage through which a fishing tackle element may move, and clasp means for selectively opening and closing said passage.

5. The construction according to claim 4 wherein said finger is flexible and said clasp means comprises a sleeve movable to and from a position in which it overlies said finger.

6. The construction according to claim 1 wherein said coupling means is rotatable relative to said body.

7. The construction according to claim 1 wherein said body has a second cavity therein at its opposite and in which said coupling means is rotatably accommodated.

8. The construction according to claim 7 including second retainer means reacting between said body and said coupling means for removably retaining said coupling means in said cavity.

9. A swivel construction for attaching a fishing tackle element to a fishing line, said construction comprising a body having opposite ends between which is a cavity; a first connector extending through one end of said body into said cavity; a second connector extending through the opposite end of said body into said cavity; first journal means accommodated in said cavity and journaling said first connector for rotation about an axis; second journal means accommodated in said cavity and journaling said second connector for rotation about an axis, each of said journal means including a bushing in which the associated connector is accommodated; retainer means accommodated in said cavity for limiting axial movement of said first and second connectors; means carried by one of said connectors for connection to a fishing tackle element; and means on the other of said connectors for connection to a fishing line.

10. The construction according to claim 9 wherein each of said journal means is removable from said cavity.

11. The construction according to claim 9 wherein the means carried by said first connector for attachment to a fishing tackle element comprises a hook forming a passage through which a tackle element may move, and a clasp movable to and from positions in which said passage selectively is opened and closed.

12. The construction according to claim 9 wherein the means carried by said second connector for attachment to a fishing lure comprises grooves for the accommodation of such line and a sleeve movable to and from a position in which it overlies said grooves for trapping therein a line occupying said grooves.

13. The construction according to claim 9 wherein each of said journal means comprises a web extending through openings in said body, each of said journal means having projections thereon which overlie and latch such journal means to said body.

14. A swivel construction for attaching a fishing tackle element to a fishing line, said construction comprising a body having opposite ends and a cavity between said ends; a connector having a spindle at one end extending through an opening in one end of said body into said cavity; journaling means removably accommodated in said cavity and journaling said spindle for rotation about an axis; retainer means separably accommodated in said cavity for restraining axial movement of said spindle; coupling means carried by said connector at its other end for connection to a fishing tackle element such as a fishing line; and means carried by said body at its opposite end for connection to another fishing tackle element such as a lure.

15. The swivel construction according to claim 14 wherein said journaling means comprises a web extending transversely of and beyond opposite sides of said body, and latch means carried by said web and engageable with the opposite sides of said body for releaseably securing said web to said body.

16. The swivel construction according to claim 14 wherein the coupling means at said other end of said connector comprises an anchor member for connection to said tackle element and clasp means for selectively trapping and releasing said tackle member.

17. The swivel construction according to claim 16 wherein said anchor member has a number of grooves in which said fishing line may be accommodated and wherein said clasp means comprises a member movable between positions in which it selectively overlies and is remote from said grooves.

18. The swivel construction according to claim 16 wherein said anchor member comprises a hook-like finger defining a loop for the accommodation of said tackle element, said finger forming a passage through which said tackle element may pass, and wherein said clasp means comprises a member movable between positions in which it selectively opens and closes said passage.

19. A swivel construction for attaching a fishing tackle element to a fishing line, said construction comprising a body having opposite ends between which is a cavity; a first connector extending through one end of said body into said cavity; a second connector extending through the opposite end of said body into said cavity; first journal means separate from said body removably accommodated in said cavity and journaling said first connector for rotation about an axis; second journal means separate from said body removably accommodated in said cavity and journaling said second connector for rotation about an axis, each of said journal means including a bushing in which the associated connector is accommodated; retainer means accommodated in said cavity for limiting axial movement of said first and second connectors; means carried by one of said connectors for connection to a fishing tackle element; and means on the other of said connectors for connection to a fishing line.

* * * * *